(12) United States Patent
Benway et al.

(10) Patent No.: US 7,146,791 B2
(45) Date of Patent: Dec. 12, 2006

(54) INTERCHANGEABLE MULCHING/DISCHARGE MOWING DECK

(75) Inventors: Randy Edward Benway, Horicon, WI (US); Benjamin Jerry Swart, Horicon, WI (US); Michael P. Schemelin, West Bend, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/700,194

(22) Filed: Nov. 3, 2003

(65) Prior Publication Data

US 2005/0091956 A1    May 5, 2005

(51) Int. Cl.
*A01D 67/00* (2006.01)
(52) U.S. Cl. ..................................... 56/320.2
(58) Field of Classification Search .............. 56/2, 56/320.2, 320.1, 17.5, 255, 295, DIG. 20
See application file for complete search history.

(56) References Cited

U.S. PATENT DOCUMENTS

| | | | | |
|---|---|---|---|---|
| 4,189,904 A | * | 2/1980 | Paker | 56/255 |
| 4,890,446 A | * | 1/1990 | Israel | 56/17.5 |
| 4,951,449 A | * | 8/1990 | Thorud | 56/2 |
| 5,133,176 A | | 7/1992 | Baumann et al. | |
| 5,191,756 A | | 3/1993 | Kuhn | |
| 5,212,938 A | | 5/1993 | Zenner et al. | |
| 5,267,429 A | * | 12/1993 | Kettler et al. | 56/295 |
| 5,305,589 A | * | 4/1994 | Rodriguez et al. | 56/320.1 |
| 5,465,564 A | * | 11/1995 | Koehn et al. | 56/320.2 |
| 5,488,821 A | * | 2/1996 | McCunn et al. | 56/320.2 |
| 5,628,171 A | * | 5/1997 | Stewart et al. | 56/320.2 |
| 5,765,346 A | * | 6/1998 | Benter et al. | 56/2 |
| 5,791,132 A | | 8/1998 | Wiedenmann | |
| 5,826,417 A | * | 10/1998 | Evans | 56/320.2 |
| 5,894,717 A | | 4/1999 | Yamashita et al. | |
| 6,192,666 B1 | * | 2/2001 | Sugden et al. | 56/320.2 |
| 6,490,850 B1 | | 12/2002 | Seegert et al. | |
| 6,681,553 B1 | | 1/2004 | Ferree et al. | |
| 2003/0196423 A1 | * | 10/2003 | Seegert | 56/320.1 |

FOREIGN PATENT DOCUMENTS

EP    1 186 221 A1    3/2002
WO    WO 94/10827    5/1994

OTHER PUBLICATIONS

Description of John Deere Piranha Deck, by Deere & Company dated Dec. 19, 2002.
Brochure for Piranha Mulching Mower, by Deere & Company dated prior to Nov. 3, 2003.

* cited by examiner

*Primary Examiner*—Árpád Fábián Kovács
(74) *Attorney, Agent, or Firm*—Bell, Boyd & Lloyd, LLC (57) ABSTRACT

A convertible mower deck having a mulching mode and a discharge mode. The deck is convertible from the mulching mode to the discharge mode by removal of an insert that extends along the rear of the cutting chamber walls of the deck.

11 Claims, 11 Drawing Sheets

INTERCHANGEABLE MULCHING/DISCHARGE MOWING DECK

CROSS-REFERENCE TO RELATED APPLICATION

This application is related to the following commonly-owned co-pending patent application: "DISCHARGE STOPPER UNITS FOR MOWING DECKS," Ser. No. 10/127,873.

BACKGROUND OF THE INVENTION

The present invention relates to a mower and more specifically to a mower deck that is quickly and easily converted between a mulching mode and at least a partial rear discharge mode.

Many municipalities now require that grass cuttings be disposed of in an environmentally responsible manner. Frequently, this means that the homeowner must either pay additional sums to have the clippings bagged and removed from their site or dispose of them on their own. One solution has been to use a mulching mower deck that cuts and recuts the grass clippings and then drives them down into the standing uncut grass. In that way, there are no clippings to be collected and disposed.

It may occur on occasion that a homeowner fails to cut the grass frequently enough to permit it to be mulched, for example, when the homeowner has been on vacation. In those situations, when the grass has grown too long to be mulched (for example, when the initial clippings would exceed one third the total grass blade length), the homeowner may prefer to simply cut and bag or discharge the grass cuttings onto the surface of the lawn. If discharged onto the lawn, the homeowner can then recut the grass in a mulch mode to mulch the precut clippings. To do so, the operator has to either use a different mulching mower, or if the homeowner has acquired a mower with a convertible mulch/discharge deck, convert the deck to the a mulch mode.

Many of today's convertible mower decks require significant time, energy and tools to make the discharge/mulch or mulch/discharge conversion. Commonly, those mowers require a blade change as well as the removal of a baffle or mulch plug. Blades that are useful for mulching do not employ the lift contour at the end of the blade used by discharge blades to create a strong air current, which is necessary to propel the discharged cuttings out of the deck and especially into a bagging structure. Those non-contoured mulching blades have to be changed to a contoured discharge blade, so that the grass can be expelled sufficiently.

Further, the mulch plug or baffle that is provided on the underside of the deck to deflect the cuttings down and into the standing grass must be removed to provide a discharge opening through the sidewall of the deck and through which the cuttings can be propelled. Removal of those plugs frequently requires tools and/or the opening of the deck to gain access to the plug. If the opening is in the side of the deck, the chute and objects projecting therefrom can hinder or prevent the mower from trimming on both sides thereof.

It would therefore be desirable to provide a mower deck that is convertible between a mulching mode and a discharge mode. Specifically, it would be desirable to provide such a deck that does not require the changing of the blade, and in which the mulch plug could be quickly and easily removed without the need for tools, and wherein the mower can trim on both sides in a discharge mode.

SUMMARY OF THE INVENTION

Toward those ends, the present invention provides a convertible mower deck that encloses the mowing blade when it is in the mulching or partial mulching mode. In a discharge mode, the deck provides one or more gaps, troughs or ducts through which cut grass clippings can escape. To convert the deck to a rear discharge mode requires merely the removal of a plug or insert that extends along the rear of the sidewall of the deck. The plug or insert is configured to fit into a slot, ridge or duct provided in the deck. A quick connect fastener at one end of the insert secures the insert to the deck. The quick disconnect fastener can be spring-loaded or otherwise configured so that no tools are required for connection, removal or replacement.

The sidewall defining the ridge or duct is flared outwardly and downwardly to provide a discharge opening in the bottom of the deck in one embodiment. In another embodiment, an aperture is defined by the back side of the deck, wherein clippings are discharged horizontally out the back of the deck. In the discharge mode, because the grass clippings are permitted to exit through the openings before they impact a mulch hump deflector (on the underside of the mower deck or on the blade) the clippings leak or blow into the opening and onto the top of the lawn or into a bag.

In one embodiment, the mower deck is configured to facilitate trimming on both sides thereof. Here, one or more discharge chutes are positioned at the rear portion of the deck so as to not interfere with trimming. The outer sides of the mower deck are identical or substantially identical in shape in one embodiment.

Two primary embodiments are disclosed herein for the inserts and the openings made in the mower deck. In one embodiment, lower rear portions of the cutting chambers of the mower deck are bent or flared outward and downward from the edge of the blade to create an opening adjacent to the blade in the rear of the deck. In that embodiment, the grass clippings fall vertically out of the mower deck before being cut a second time or mulched. In another embodiment, portions of the rear ends of the cutting chambers of the deck are cut away, bent and formed so as to create a duct or airfoil opening in the sidewall of each of the chambers of deck. A windfoil or other type of directional member extends from opening to direct air and grass clippings towards a desirable destination.

In one embodiment, the grass clippings are blown out the back of the mower deck on an angle towards a centerline of the lawnmower, so as to place the clippings behind the mower in a suitable position to be bagged by the mower or swept by a sweeper attached to and carried by the mower. To that end, the mower blade drives are configured to spin the blades in opposite directions, which causes the blades to provide a centripable force to the clippings exiting the duct so that the direction of the clippings exiting the deck is substantially in line with the windfoil or directional members extending from the openings in the back wall of the deck. The ducting and direction of the discharge chute force the clippings to blow towards the reward centerline destination.

The inserts in one embodiment are inserted and removed readily via a single fastener or a quick disconnect per insert. The housing defines a slot or notch, which receives one end of the insert or a member extending therefrom. The other end of the insert is then attached via the fastener or quick disconnect. To remove the inserts, the fastener is removed or the quick disconnect is moved and the insert is slid, e.g., down and away from the notch or slot in the housing. The inserts are generally elongated horizontal members that are relatively "low profile" with respect to known larger side discharge covers. The low profile provides a rigid, strong insert that can withstand the rigors of mowing.

In the partial discharge mode, some or the grass clippings are cut once and the blown from the deck. In the partial discharge mode, however, some of the clippings are recut or reprocessed, like a mulch. In one embodiment about half the clippings are mulched and half are discharged. The release of some of the clippings allows the mower to cut tall grass, continuously, without the mower becoming clogged or leaving behind clumps of grass. In a mulch mode, i.e., with the inserts in place, most all the clippings are reprocessed and mulched. It is therefore an advantage of the present invention to provide a mulching and discharge mowing deck for a lawnmower.

It is another advantage of the present invention to provide a mulching/discharge mowing deck that is easy to convert back and forth from a mulching mode to a discharge mode.

It is another advantage of the present invention to provide a mulching/discharge mower that blows grass towards a central destination behind the lawnmower, where it can be bagged by the lawnmower or swept by a sweeper that is pulled by the lawnmower.

Yet another advantage of the present invention is to provide a mulching/discharge deck that does not discharge grass and other objects out the side of the lawnmower.

Still another advantage of the present invention is to provide a mulching/discharge deck that enables the mower to trim grass against a dwelling or other structure with substantially the same degree of precision on both sides of the mower.

Still further, it is an advantage of the present invention to provide a mulching/discharge deck for a lawnmower that does not require the removal and replacement of a mowing blade for converting the lawnmower from a mulching mode to at least a partial discharge mode and vice versa.

Yet a further advantage of the present invention is to provide an insert for a mower deck that is rugged and durable to withstand forces produced via mowing. Additional features and advantages of the present invention are described in, and will be apparent from, the following Detailed Description of the Invention and the figures.

DETAILED DESCRIPTION OF THE INVENTION

Figure 1:
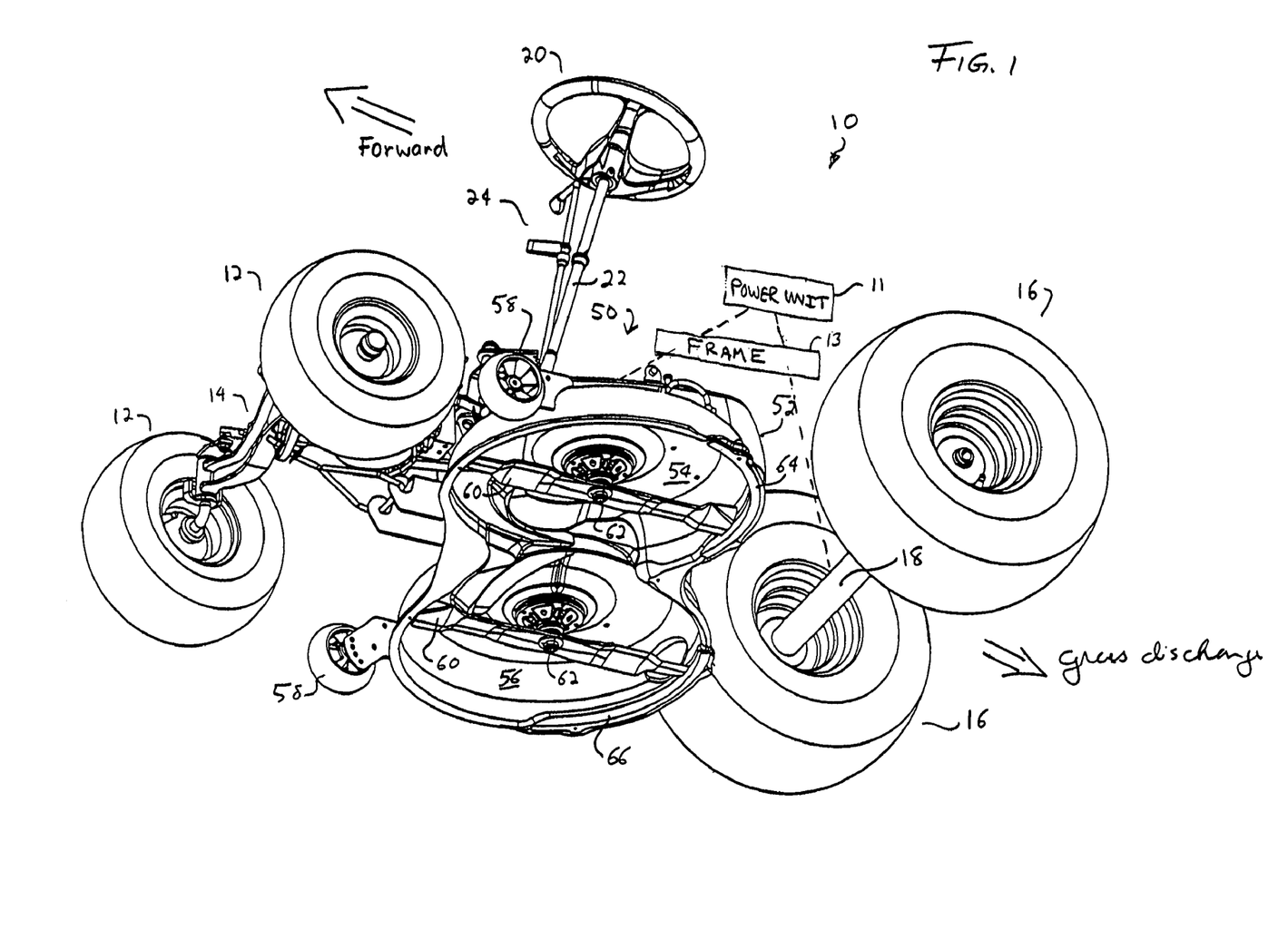
FIG. 1 is a bottom-side perspective view of a drive train and mower deck in one embodiment of the present invention.

Referring now to the drawings and in particular to FIG. 1, a drive train 10 for a riding lawnmower having a motor, engine or other power unit 11 supported by a frame 13 is illustrated. The seat and chassis have been removed for ease of illustration. Drive train 10 includes front wheels 12 supported rotably by front axle 14. Drive train 10 also includes rear wheels 16 supported by a rear axle 18. A steering wheel 20 is provided that connects pivotally to drive train 10 via a steering wheel shaft 22. Controls, such as directional drive settings, speed adjust, gearing, breaking, cutting blade on/off and other control settings are controlled by control devices or controls 24.

In one embodiment, the present invention includes a dual blade lawnmower deck 50 located on the underside of drive train 10. While deck 50 is illustrated operating with a riding mower, deck 50 is alternatively operable with any suitable lawnmower, walk-behind mower or other mowing machine, including walk-behind mowers with one, two or three cutting blades. As the drive train 10 of the lawnmower is propelled forward, the mower deck 50 proceeds along the ground, contacting the grass, plants, leaves and other materials to be mowed as is well known.

Mower deck 50 includes a housing 52 that defines two mowing chambers 54 and 56. Each of the chambers 54 and 56 defined by housing 52 is supported by a respective support wheel or roller 58. Wheels 58 maintain the cutting blades inside chambers 54 and 56 of deck 50 at a relatively constant height above the ground when drive train 10 of the mower is in motion. Wheels 58 help to prevent scalping or uneven cutting when the mower meets a hill or elevation change.

Drive members, drive shafts or spindles 62 are attached rotatably to the housing 52 substantially at the centers of chambers 54 and 56. Blades 60 are attached to distal ends of spindles 62. FIG. 1 also shows discharge control devices or inserts 64 and 66 of the present invention that are attached to the rear portion of housing 52 in chambers 54 and 56 respectively.

Figure 2:
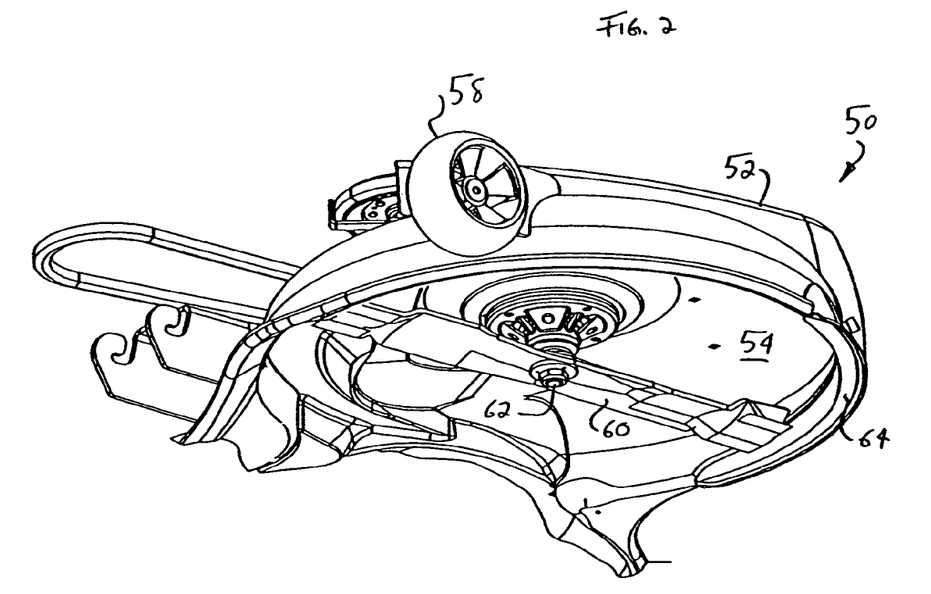
FIG. 2 is a bottom-side perspective view of one of the cutting chambers in one embodiment of the mowing deck of the present invention.

FIG. 2 illustrates more closely the chamber 54 of mower deck 50, which is defined by a portion of housing 52. Blade 60 is supported by spindle 62 via a nut and washer threaded onto spindle 62. FIGS. 1 and 2 illustrate discharge control device or insert 64, which is removeably fixed inside the back half of chamber 54 when mower deck 50 and the lawnmower are intended to be operated in a mulching mode.

Blade 60 is a mulching blade in one embodiment. Blade 60 has a bent configuration so that airflow created by blade 60 urges grass blades or other material at the end of the blade to stand up when cut a first time. The cut clippings are then moved by blade 60 and a mulch ramp (shown below) toward the inner portion of the blade, wherein the clippings are cut again. The blade is further configured at its inner portion to create a down-draft. The down-draft pushes recut or mulched clippings towards the ground and intersperses such clippings into the cut grass.

One suitable blade for deck 50 and the lawnmower employing same is described in U.S. Pat. No. 5,191,756 assigned to the assignee of the present invention, the teachings of which are hereby incorporated by reference. That patent at FIG. 4 shows a mulching blade with an updraft portion at the end thereof and an inner cutting edge which is humped or elevated above an outer cutting edge. The inner humped portion cuts the grass at a different height than does the blade at its outer edges. The different cutting levels cause the grass to be cut into smaller pieces, i.e., to be mulched. The inner portion is also configured to create a down-draft to drive the mulched clippings into the ground. FIGS. 2, 5, 6 and 7 of that patent also describe a mulch ramp, which directs the clippings from the outside of the blade to the inside of the blade to be recut or mulched. Mulching blades without mulch humps are also suitable for operation with deck 50.

Figure 3:
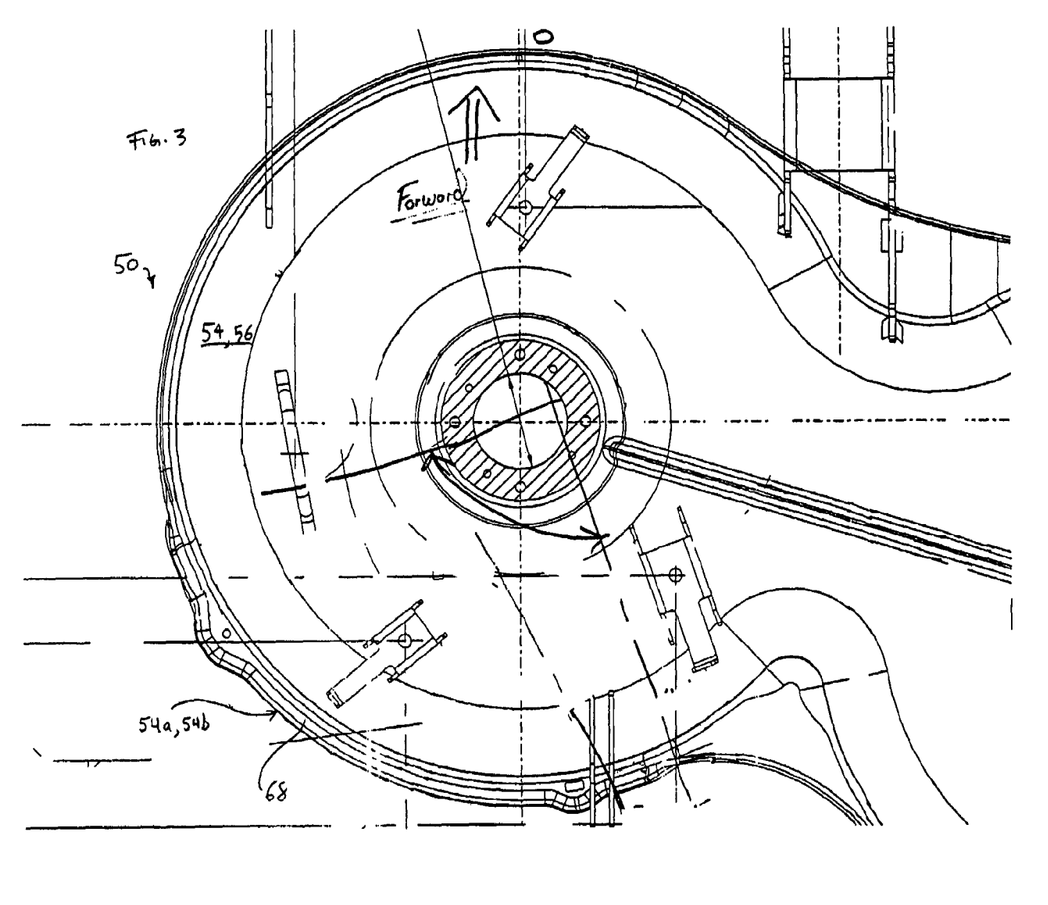
FIG. 3 is a top plan view of a portion of one embodiment of the mowing deck of the present invention.

FIG. 3 shows a top view of one embodiment of one of the chambers 54 or 56 of deck 50. A rear portion of the chamber 54 or 56 includes a sidewall 54a or 56a, which defines a hollow ridge 68. One of the inserts 64 or 66 is fitted and fastened into hollow ridge 68, placing the mower in a mulch mode. The insert 64 or 66 is removed from hollow ridge 68 to allow some of the grass clippings in one embodiment to escape vertically downward in a partial discharge mode between the blade and the housing 52. Some of the clippings drop away or "leak" from mower deck 50 prior to being cut again or mulched. Other clippings, e.g., from about zero (if ridge is large enough) to about eighty percent of the clippings are mulched, creating a hybrid mulch/discharge operating mode. Different shapes for ridges 68 are illustrated below.

The discharge control devices or inserts 64 and 66 are blow molded or injection molded hard plastic in one embodiment. In another embodiment, inserts 64 and 66 are cut or stamped from aluminum or other light, strong metal. In a further embodiment, the inserts are formed or bent metal, such as formed steel or stainless steel. The material is rugged and withstands the pounding taken by deck 50 when the mower is in use. Also, as seen below, the inserts are relatively "low profile" and do not create a significant cantilever with respect to the sidewalks of chambers 54 and 56. Consequently, the inserts and the assembly of the chambers and inserts are well equipped for the rigors of mowing.

Figure 4:
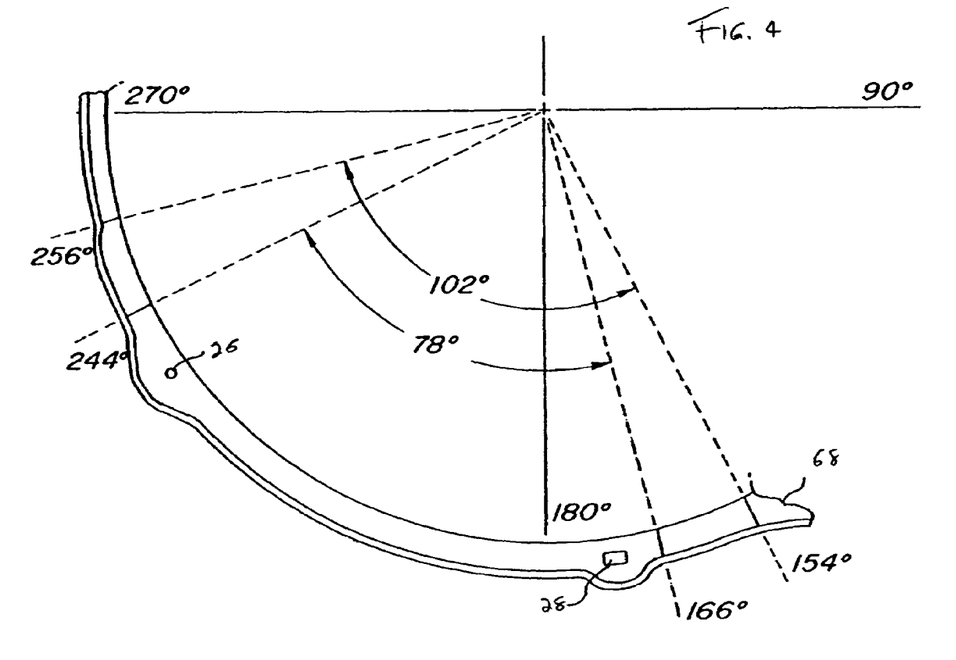
FIG. 4 is a bottom plan view of a ridge portion of the mowing deck, which receives one of the inserts in one embodiment of the present invention.

FIG. 4 shows one embodiment of ridge 68 into which insert 64 or 66 is fitted. Ridge 68 includes apertures 26 and 28 or other types of mounting structures for such attachment. Inserts 64 or 66 can be configured and oriented the same way or be made in a left and right pair configuration. In one embodiment, one end of the insert fits into a notch or slot, such as slot 28, or other type of male or female structural support defined by ridge 68. The other end of inserts 64 and 66 attach to the ridge 68 or housing 52, e.g., via mounting hole 26 and a quick-disconnect type of fastener, such as a spring-loaded clip, a bolt and a wing nut, etc.

The above-described configuration enables discharge control devices or inserts 64 and 66 to be readily fastened to ridges 68 or housing 52 by lodging one end of the insert 64 or 66 against or in the notch, slot or catch of ridge 68 or housing 52 and then fastening the other end of the insert 64 or 66 to the respective ridge 68 via the quick disconnect fastener. Attachment can therefore be performed in one step and with no tools. Likewise, to remove inserts 64 and 66, the single disconnect is removed or moved and the insert is pulled away from the notch, slot or catch of the associated ridge 68. Removal can also be performed in one step with no tools.

Figure 5A:
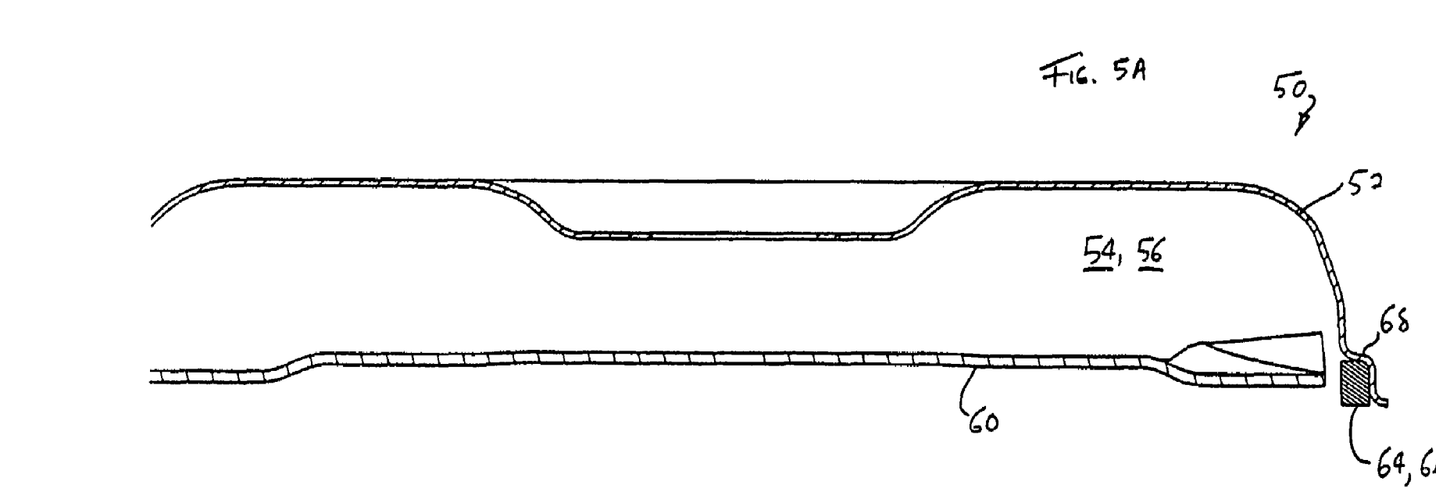
FIGS. 5A and 5B illustrate one possible shape for the bent ridge and insert of the mowing deck in one embodiment of the present invention.
Figure 5B:
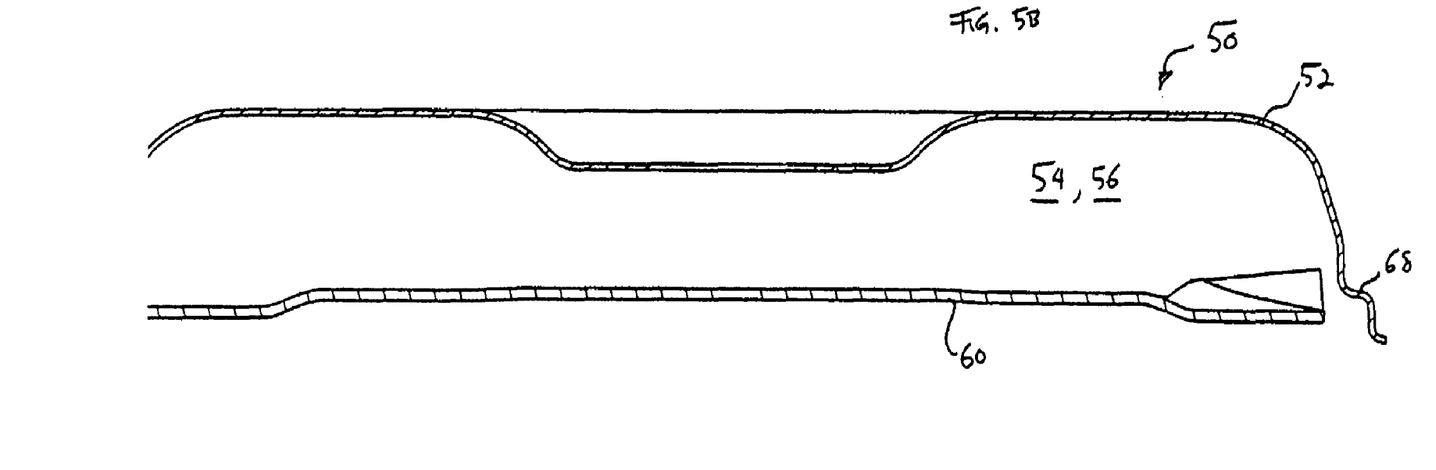
Figure 6A:
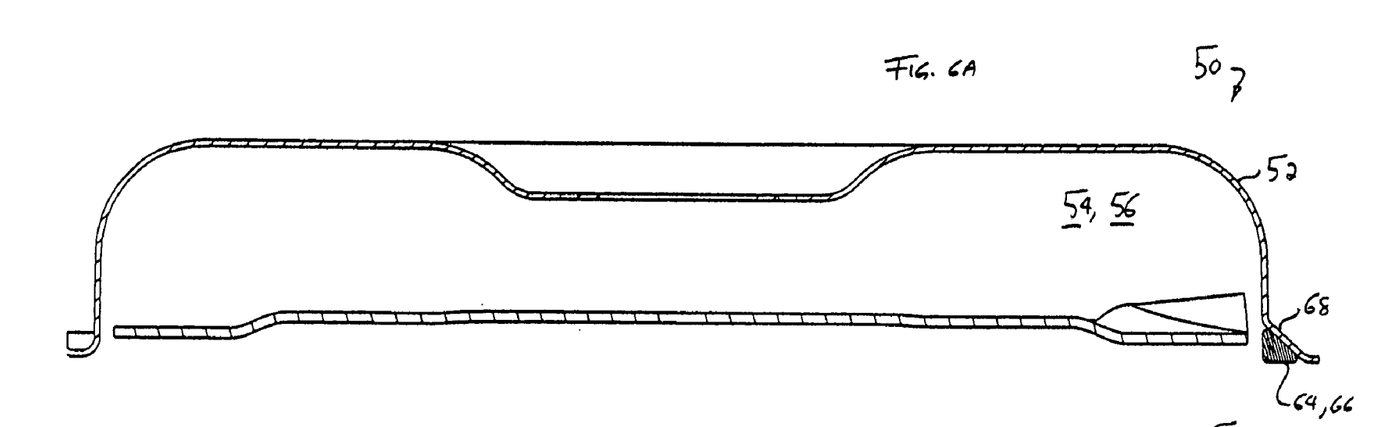
FIGS. 6A and 6B illustrate another possible shape for the bent ridge and insert of the mowing deck in one embodiment of the present invention.
Figure 6B:
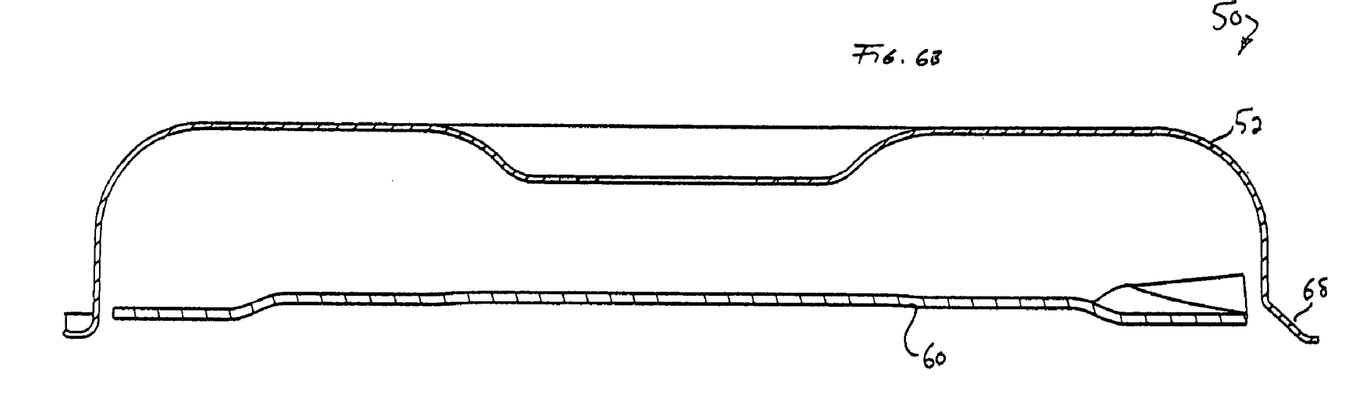
Figure 7A:
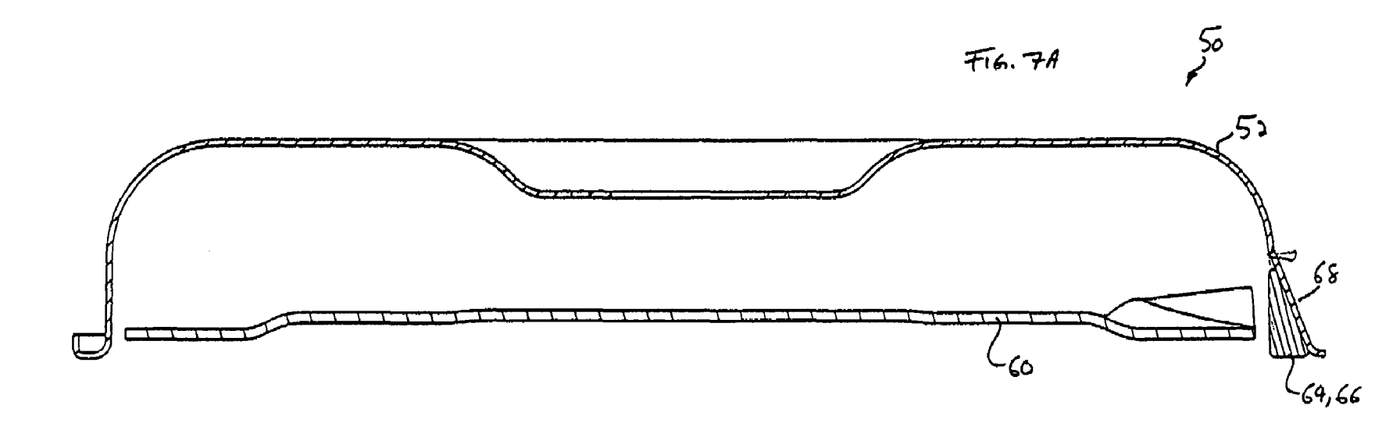
FIGS. 7A and 7B illustrate a further shape for the bent ridge and insert in one embodiment of the present invention.
Figure 7B:
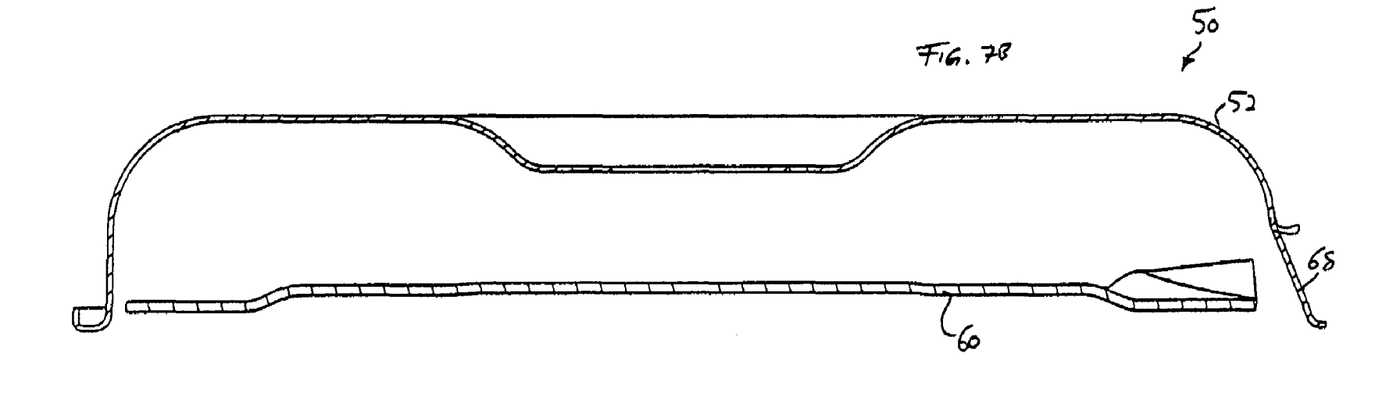

FIGS. 5A to 7B each show different cross-sectional shapes for the inserts 64 and 66 and ridge 68. FIGS. 5A and 5B show a square or rectangular shaped ridge 68. FIGS. 6A to 7B show ridges 68 positioned at various angles. FIGS. 5A, 6A and 7A each show corresponding fitted cross-sections of inserts 64 and 66. Each of the ridges 68 of FIGS. 5A to 7B function as spacers, which serve to create a space or opening as seen in FIGS. 5B, 6B and 7B that allows grass clippings initially cut to pass outside the end of blade 60 and fall to the ground without being cut twice or mulched, e.g., leak out the bottom of deck 50. When insert 64 or 66 is placed inside ridge 68, as seen in FIGS. 5A, 6A and 7A, the insert functions as a space filler causing the clearance between the end of blade 60 and an inner surface of chambers 54 and 56 to be substantially the same around the entire circumference struck by the end of blade 60 (except where chambers 54 and 56 open into one another). Such consistent clearance, about one quarter inch (6.4 mm) in one embodiment causes the grass to be mulched by leaving little or no discharge gap. Consequently, when the blade 60 rotates, the space fillers or inserts 64 and 66 retain the grass on the top side of the blades for a suitable period of time to enable a mulching action to occur.

Figure 8:
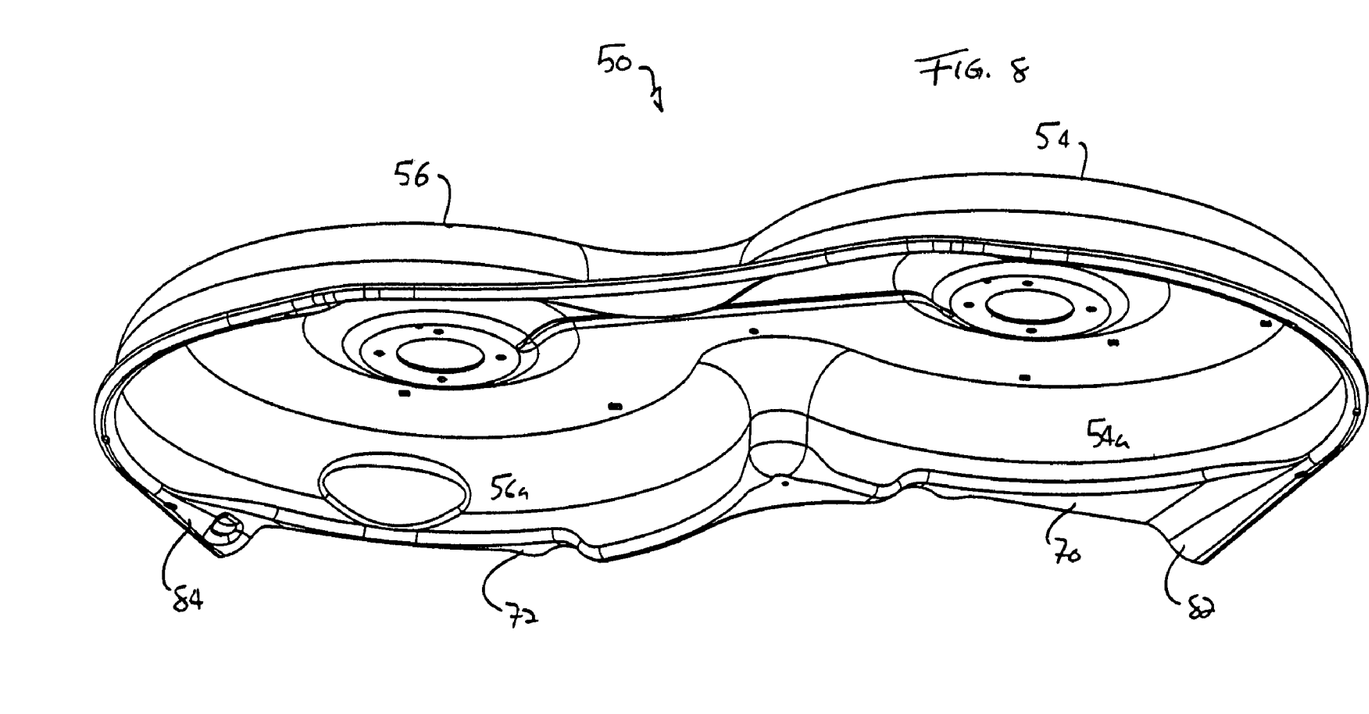
FIGS. 8 and 9 are perspective views illustrating one preferred mower deck and shapes for the openings therein.
Figure 9:
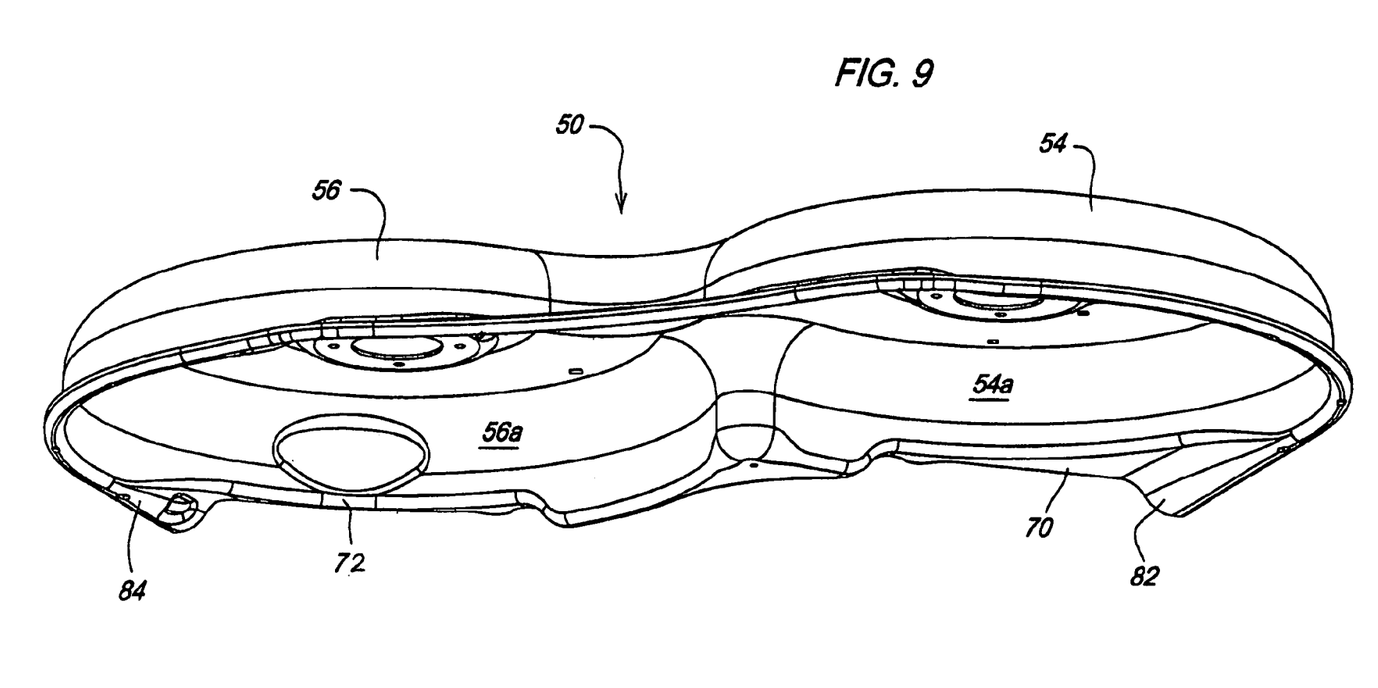

FIGS. 8 and 9 are perspective views showing the underside of one preferred mower deck 50. As illustrated, portions of the rear sidewalls 54a and 56a of chambers 54 and 56 of housing 52 are removed to create low profile openings that enable at least some of the grass clippings in a partial discharge mode to escape out of the back of deck 50 before being reprocessed, cut again or mulched. Some of the clippings in the partial discharge mode be recut or mulched. Depending of the height of the openings created by ducts 70 and 72, more or less clippings will be discharged rather than mulched. It is possible to open deck 50 enough by making openings via ducts 70 and 72 high enough to create a total discharging mower mode.

In one embodiment, the height of the openings created by ducts 70 and 72 is about ¼ inch (6 mm) to about 1 inch (25.4 mm), which varies the percentage of clippings discharged to those mulched. Larger or smaller openings are also contemplated by the present invention so that the percentage of clippings discharged to the total grass clippings created is from about zero percent to about eighty percent. In one preferred embodiment, about fifty percent of the clippings are mulched and fifty percent are discharged, which enables tall grass to be cut without stalling or clumping.

Airfoils 82 and 84 extend from ducts 70 and 72, respectively, and cooperate with the mower blades to direct and release air and clippings in an efficient and desired manner. Airfoils 82 and 84 extend from ducts 70 and 72 tangentially so as not to disrupt the momentum of the grass and air exiting the ducts 70 and 72.

Figure 10:
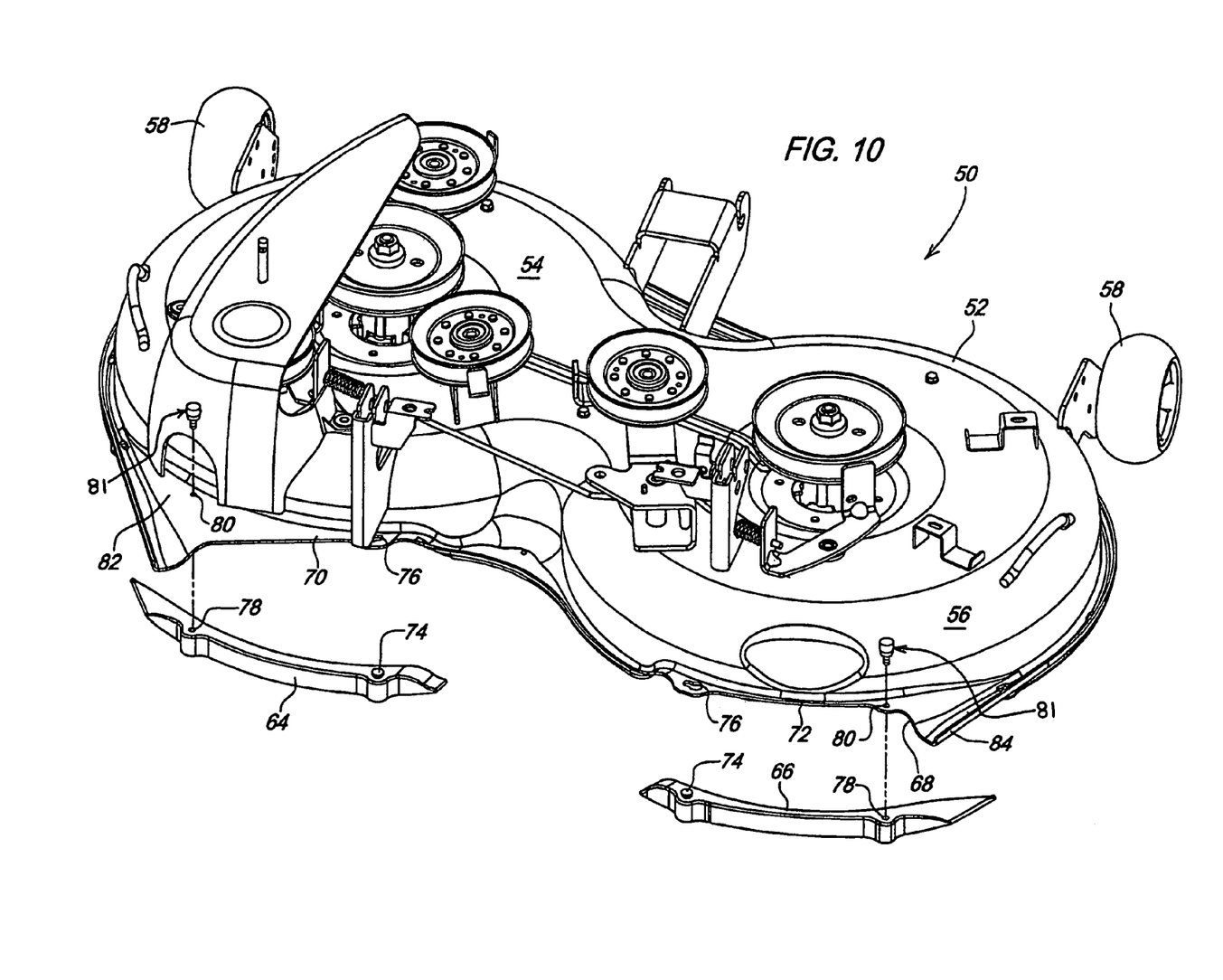
FIG. 10 is a top-rear perspective view of one embodiment of the mower deck of the present invention showing the inserts removed slightly from one preferred opening and ducting therefore shown in FIGS. 8 and 9 for discharging grass of the present invention.

FIGS. 9 and 10 are top and bottom views of one preferred configuration of mulching/discharge deck 50, respectively, showing ducts 70 and 72 in cooperation with inserts 64, 66 and blades 60. As discussed above, discharge ducts 70 and 72 replace the ridge 68 of the previous embodiments. Discharge ducts 70 and 72 enable grass clippings in the discharge mode to escape freely substantially horizontally from a removed sidewall portions 54a and 56a of deck 50 (as opposed to the opening defined at the bottom of deck 50 as seen in FIGS. 5A to 7B). The discharge control devices or inserts for ducts 70 and 72 therefore block the grass clippings from exiting through the back of deck 50 as well as through the bottom of deck 50 as opposed to only through the bottom of deck 50 as seen in FIGS. 5A to 7B. Here, the inserts 64 and 66 preferably function as discharge stoppers or closure members that actually create the lower back wall portions of housing 52 of deck 50.

Ducts 70 and 72 provide a more open and streamlined area or room for the grass clippings in the discharge mode to escape versus the ridge 68 of FIGS. 5A to 7B. In the mulch mode, however, inserts 64 and 66 create again a constant clearance between the blade and the sidewalls of chambers 54 and 56, except where those chambers open into one another. Inserts 64 and 66 complete the inner profile defined by chambers 54 and 56, so that the clearance between the inner surface of the chambers and the mower blade remains substantially unchanged. Inserts 64 and 66 can extend from about 60 degrees to about 120 degrees about the outside of the chambers 54 and 56. As seen in FIG. 10, inserts 64 and 66 bolt to or otherwise fasten easily to ducts 70 and 72, respectively.

FIG. 10 illustrates that a guide or member 74 extends from each insert 64 and 66 at a point located near the inner ends of the inserts. To attach inserts 64 and 66 to ducts 70 and 72, respectfully, the first step is to insert a larger radius portion of members 74 through a larger diameter portion of a keyed aperture 76. Once the larger diameter head of member 74 is inserted through aperture 76, the inserts 64 and 66 are slidably moved against the ducts 70 and 72, respectively, until a threaded hole 78 of inserts 64 and 66 comes into alignment with a mounting hole 80 provided on ducts 70 and 72. Once holes 78 and 80 are aligned, a pin, screw, bolt or other type of fastener 81 is used to fixedly attach inserts 64 and 66 to chambers 54 and 56 of the housing 52 of the mower deck 50. Likewise, to remove inserts 64 and 66, the fasteners are removed from threaded holes 78 of inserts 64 and 66 and the inserts are slidably moved in the opposite direction until the larger diameter portion of members 74 can be dropped through the larger diameter portion of keyed aperture 76. While the method of attachment is easy to perform, the attachment system is sturdy and withstands the rigors of repeated and continuous mowing.

Figure 11:
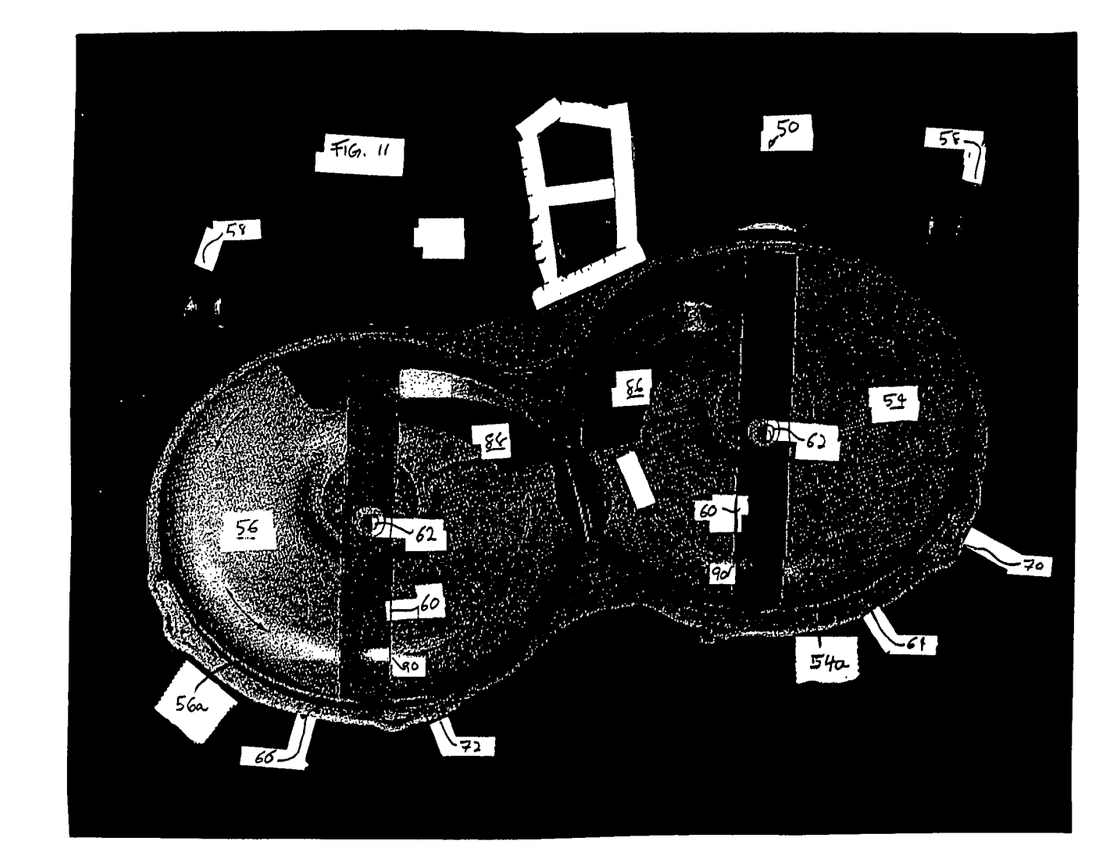
FIG. 11 is a bottom perspective view of the mower deck in one embodiment of the present invention illustrating the operation of the mulching blades in combination with mulch ramps placed in each cutting chamber of the deck shown in FIG. 10.

FIGS. 10 and 11 illustrate that cutting chamber 54 is set slightly ahead of cutting chamber 56 with respect to the forward direction of travel of the lawnmower. The offset nature of the blades 60 within chambers 54 and 56 helps to insure a smooth overlapping cut provided by the dual blade lawnmower. FIG. 11 also illustrates that the blades 60 travel in opposite rotational directions (as indicated by the illustrated arrows). The blade rotation is set to align the momentum or flux of air and grass exiting ducts 70 and 72 with the taper or direction provided by the associated windfoils 82 and 84. Spoilers or airfoils 82 and 84 are arranged to be in line with the direction of the air path at the beginning of openings via ducts 70 and 72 created by blades 60.

As seen in FIG. 10, discharge chute or duct 70 includes a material director, spoiler or windfoil 82 that tends to direct air and grass clippings exiting through duct 70 towards a centerline running in the direction of travel of the lawnmower. The blade 60 as seen in FIG. 10 of chamber 54 runs counter clockwise around spindle 62 and thus carries the grass along the outer edge of housing 52 of chamber 54 and throws the grass out along and through airfoil 82 towards the inner portion of the lawnmower. Likewise, discharge chute or duct 72 includes a material director, spoiler or windfoil 84 that directs air and grass towards the inner portion of the lawnmower. Blade 60 of chamber 52 in FIG. 10 rotates clockwise and carries the air and grass clippings along the outer edge of housing 52 towards and through airfoil 84 of duct 72. Airfoils 82 and 84, therefore, cooperate to create a stream of grass that is placed relatively centrally behind the lawnmower. Again, at least in some embodiments, a portion of the clippings are recut or mulched when inserts 64 and 66 are removed. The portion that is not recut is carried along the sidewalls of chambers 54 and 56 and thrown out along airfoils 82 and 84 through ducts 70 and 72, respectively. The portion that is recut is forced via the down-draft created by blades 60 to fall to the ground.

In one embodiment, a material or grass catch or collector (not illustrated), such as a hopper, is attached to the lawnmower and communicates fluidly with ducts 70 and 72 so that grass is blown into the grass catch as is well known. In another embodiment, the lawnmower includes a hitch (not illustrated) that enables a lawnmower sweeper be pulled behind the lawnmower to sweep up and capture the grass clippings after being thrown from the back of the lawnmower opposite to the direction of travel of same.

FIG. 11 illustrates that blades 60 and deck 50 cooperate with a material director or mulch ramp 86 fitted inside chamber 54 and a material director or mulch ramp 88 fitted inside chamber 56. Mulch ramps 86 and 88 can be formed from a single piece or formed in separate pieces. In one embodiment, mulch ramps 86 and 88 are made of hard plastic. Alternatively, mulch ramps 86 and 88 are metal, such as steel or aluminum.

Mulch ramps 86 and 88 cooperate with blades 60 and their respective direction or rotation to guide grass once it has been cut a single time towards an inner portion of the blade 60, where the blade cuts the grass a second or third time. Blades 60 are shown having an irregularity, an elevation change or a mulch hump 90, which cuts the grass clippings as they are pressed against mulch ramps 86 and 88 and forced across mulch hump 90 and towards the inner portion of the blades 60. As discussed above, in connection with U.S. Pat. No. 5,191,756 the outer edges of blades 60 are oriented to create an updraft that stands the grass blades up to cut them initially. The inner portion of the blade 60 has a raised leading edge with a cutting blade to recut or mulch the initially cut clippings and a lowered trailing edge to create a down-draft to drive the mulched clippings into the ground. Mulching occurs when inserts 64 and 66 are installed and to a lesser extent when inserts 64 and 66 are removed (allowing some of the initially cut grass clippings to be thrown from and exit the back of deck 50).

In another alternative embodiment, not illustrated, inserts 64 and 66 are combined to form a one-piece or integral discharge control device or insert that bolts or fastens in one or more places to a single duct or ridge provided in a middle portion of the back of an alternative deck, where the chambers 54 and 56 interface together. The blades 60 would then rotate in the opposite direction than the directions shown in FIG. 9 to throw grass out the middle of the back of the deck when the one piece insert is removed.

In operation of one embodiment, when inserts 64 and 66 are in place, the inserts inhibit or prevent the initially cut grass from escaping, and the grass is forced to be carried across ramps 86 and 88 for further cutting and mulching. The downward draft created by the middle portion of blades 60 then forces air and the mulched grass clippings towards the ground and between the remaining lawn blades extending therefrom. When inserts 64 and 66 are removed, however, at least a potion of or substantially all of (depending on size of openings via ducts 70 and 72) the initially cut clippings are carried by blades 60 along the outside edges of chambers 54 and 56 and are pushed out through ducts 70 and 72 via airfoils 82 and 84, e.g., through the back out of deck 50. That is, in the discharge mode, the initially cut clippings are not forced or directed against mulch ramps 86 and 88 for further cutting. The mulch ramps 86 and 88 can also be used with the bent ridges 68 described above.

The discharge chutes or ducts 70 and 72 and ridge 68 described above have a relatively low profile with respect to large side discharge openings common to many known lawnmowers. The low profile helps to reduce noise from escaping from the chambers as well as to keep rocks and other particles from being thrown therefrom.

It should be appreciated that the mower deck of the present invention can be installed and used on any vehicle, tractor, mowing machine, lawnmower, walk-behind lawn-mower, riding lawnmower, string or blade-type trimmer or any other machine which mows, cuts, mulches, trims or shapes lawn, grass, weeds, plants, leaves or other materials.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A mower deck comprising:
   a mower housing defining at least one cutting chamber, the mower housing having a front portion and a rear portion, the rear portion of the mower housing having: (a) at least one sidewall which defines a discharge opening, the sidewall having an extension configured to guide a flow of material from the discharge opening to a destination, the extension having a first end and a second end, the first end being coupled to the sidewall, the second end being located further from the front portion of the mower housing than the first end, the second end having at least one engagement region;
   an insert having at least one engagement region, the insert configured to block the discharge opening when the insert is attached to the rear portion of the mower housing;
   at least one fastener configured to couple the engagement region of the insert to the engagement region of the second end of the extension, a portion of the fastener being configured to be positioned adjacent to the rear portion of the mower housing, the portion of the fastener being movable between:
      (a) one position resulting in the insert being attached to the rear portion of the mower housing; and
      (b) another position resulting in the insert being: (i) detached from the rear portion of the mower housing; or (ii) detachable from the rear portion of the mower housing through hand manipulation of the insert; and
   at least one cutting blade rotatably coupled to the mower housing, the cutting blade being positioned within the cutting chamber.

2. The mower deck of claim 1, wherein the insert is coupled to the sidewall via a single fastener wherein the rear portion of the sidewall includes a guide member, the guide member operable with the fastener to maintain the position of the insert at the discharge opening when the insert is attached to the rear portion.

3. The mower deck of claim 1, which includes a mulch ramp positioned on an underside of the top surface, above the blade, the ramp operating to direct grass out at an outer portion of the blade towards an inner portion thereof.

4. The mower deck of claim 1, wherein the discharge opening is oriented with respect to a rotational direction of the cutting blade to be in-line with a direction of air and grass flow caused by the rotational direction.

5. The mower deck of claim 1, wherein: (a) the insert has a plurality of ends and an engagement region adjacent to each one of the said ends; and (b) the sidewall of the rear portion of the mower housing has at least one other engagement region in addition to the engagement region of the second end of the extension, the insert being configured so that, when the insert is attached to the rear portion of the mower housing: (a) one of the engagement regions of the insert is engaged with the engagement region of the second end of the extension; and (b) another one of the engagement regions of the insert is engaged with the other engagement region of the sidewall of the rear portion of the mower housing.

6. The mower deck of claim 5, wherein the fastener support wall includes a guide member, and the insert includes a portion configured to engage the guide member.

7. The mower deck of claim 6, wherein the fastener support wall includes a member selected from the group consisting of a wall defining an opening and a protruding member.

8. A mower deck comprising:
   a top surface;
   a cutting blade rotatably supported beneath the top surface;
   at least one sidewall extending downward from the top surface and forming a cutting chamber within which the blade rotates, the sidewall including a front sidewall portion and a rear sidewall portion, the rear sidewall portion having:
      (a) a discharge wall which defines a discharge opening;
      (b) a material director having: (i) a first end adjacent to the rear sidewall portion; and (ii) a second end located further from the rear sidewall portion than the first end, the material director operable to guide a flow of material from the discharge opening to a destination beyond the second end of the material director;
      (c) a fastener support wall connected to the second end of the material director;
      (d) an insert configured to: (i) be attached to the rear sidewall portion; and (ii) block the discharge opening when the insert is attached to the rear sidewall portion; and
      (e) at least one fastener operable to couple the insert to the fastener support wall, a portion of the fastener configured to be positioned adjacent to the second end of the material director.

9. The mower deck of claim 8, wherein: (a) the rear sidewall portion has: (i) a plurality of fastener support walls including a first fastener support wall and a second fastener support wall; and (ii) a first attachment member positioned at the first fastener support wall; and (b) the insert has: (i) a first insert attachment member configured to be removably coupled to the first fastener support wall through hand manipulation of the insert; and (ii) a second insert attachment member configured to be removably coupled to the second fastener support wall through movement of the fastener.

10. The mower deck of claim 9, wherein the material director is an extended portion of the rear sidewall portion.

11. The mower deck of claim 10, wherein the mower deck is connectable to a machine operable to travel along a travel line, the mower deck having has a center line parallel to the travel line, the extended portion being configured to guide the material along another line which intersects with the center line.

* * * * *